United States Patent [19]
Abramov et al.

[11] Patent Number: 6,011,886
[45] Date of Patent: Jan. 4, 2000

[54] RECOATABLE TEMPERATURE-INSENSITIVE LONG-PERIOD GRATINGS

[75] Inventors: Anatoli A. Abramov, Highland Park, N.J.; Arturo Hale, New York, N.Y.; Ashish Madhukar Vengsarkar, Berkeley Heights, N.J.

[73] Assignee: Lucent Technologies Inc., Murray Hill, N.J.

[21] Appl. No.: 08/951,778

[22] Filed: Oct. 16, 1997

[51] Int. Cl.[7] ........................................ G02B 6/34
[52] U.S. Cl. ........................... 385/37; 385/144; 385/123
[58] Field of Search .......................... 385/37.123, 144, 385/145; 359/341, 566, 568, 569, 577, 578, 345

[56] References Cited

U.S. PATENT DOCUMENTS

| | | | |
|---|---|---|---|
| 5,042,898 | 8/1991 | Morey et al. | 385/37 |
| 5,430,817 | 7/1995 | Vengsarkar | 385/37 |
| 5,757,540 | 5/1998 | Judkins et al. | 359/341 |

FOREIGN PATENT DOCUMENTS

| | | |
|---|---|---|
| 0 767 391 A2 | 4/1997 | European Pat. Off. . |
| 0 767 391 A3 | 9/1997 | European Pat. Off. . |
| WO 97/26572 | 7/1997 | WIPO . |

OTHER PUBLICATIONS

D.L. Weidman et al,: "A Novel Negative Expansion Substrate Material For Athermalizing Fiber Bragg Gratings", 22nd European Confernce on Optical Communication, vol. 1, Sep. 15–19, 1996, pp. 1.61–1.64, Oslo, Norway.

*Primary Examiner*—Rodney Bovernick
*Assistant Examiner*—Ellen E. Kang

[57] ABSTRACT

Applicants have determined that the temperature sensitivity of long period grating devices is substantially affected by the provision of a polymeric coating over the conventional glass cladding and, in particular, that by providing a polymer overcoating with an appropriately selected index of refraction, one can minimize temperature sensitivity. In a preferred embodiment, the temperature sensitivity of a long period grating written in conventional dispersion-shifted fiber is reduced to 0.40 nm/100° C.

19 Claims, 5 Drawing Sheets

RECOATABLE TEMPERATURE-INSENSITIVE LONG-PERIOD GRATINGS

FIELD OF THE INVENTION

This invention relates to long-period gratings and, in particular, to long-period gratings recoated with polymer for enhanced temperature stability.

BACKGROUND OF THE INVENTION

Long-period gratings are in-fiber devices that can couple light between two dissimilar co-propagating spatial modes in a fiber. These devices typically comprise a length of optical fiber with a long-period grating which is formed by a plurality of refractive index perturbations spaced along the fiber by a periodic distance $\Lambda$. In general, long-period grating devices are those in which the period is at least 10 times larger than the wavelength of the input light. Typically $\Lambda$ is in the range 15–1500 $\mu$m. The modes being coupled by the grating are either different modes guided by the core or are those guided by the cladding (with the next surrounding region, say air or a coating, acting as the effective cladding for these modes).

The major functional difference between long-period gratings and conventional short-period Bragg gratings (periods $\Lambda < 1$ $\mu$m) is that there is no backreflected mode in a long-period grating. As an example, the light can be coupled out of the core from a fundamental mode and into the cladding of a fiber on a wavelength selective basis.

In the past, these devices have been used as simple mode-converters (Hill et al., U.S. Pat. No. 5,104,209, Method of Creating an Index Grating in an Optical Fiber and a Mode Converter Using the Index Grating), as wavelength-dependent loss elements in broadband amplifiers (Vengsarker et. al., *Opt. Lett.* Vol. 21, p. 336, 1996) in high-power fiber lasers, (Grubb and Stentz, *Laser Focus World*, Feb., 1996, p. 127), and as band-rejection filters (Vengsarkar, et. al., *Journal of Lightwave Technology*, vol. 14 p. 58, 1996) See also U.S. Pat. No. 5,430,817 issued to A. M. Vengsarkar on Jul. 4, 1995, which is incorporated herein by reference.

While these devices provide an elegant solution to many problems in fiber communications, they exhibit temperature sensitivity. The peak wavelength $\lambda_p$ shifts by 4–10 nm per 100° C. change in temperature. For some applications where ambient temperatures can fluctuate between 5° and 45° C., such variations are not acceptable and temperature compensation schemes are desirable. The simplest solution is to place the grating device in a controlled temperature chamber; this solution, however, adds temperature controllers, thereby adding cost and increasing reliability concerns.

Several other solutions have also been suggested. For example, U.S. patent application Ser. No. 08/695,180, is now patented with U.S. Pat. No. 5,703,978, in the name of DiGiovanni et al. demonstrates a method of changing the fiber composition and profile such that the temperature dependence of the peak wavelength can be reduced below 4 nm per 100° C. change in temperature. This solution, while useful for many applications, places the burden of stabilization on accurate preform and fiber manufacture. It further eliminates the possibility of using standard telecommunication fibers as the grating host, raises the necessity of splicing and introduces added insertion losses.

Another method is described in U.S. Pat. No. 5,757,540, "Long-Period Fiber Grating Devices Packaged for Temperature Stability", issued May 26, 1998, to Judkins et al., and assigned to the present assignee. The method of the '540 patent a specifically tailored grating where the dependence of the peak wavelength is opposite in polarity for strain and temperature. Such a specially designed grating is packaged in a material with a specific thermal expansion and leads to a packaged temperature-insensitive device. This method, while attractive, places the burden of stabilization on the packaging material and, by its operating principle, requires that the fiber grating be placed under strain during its entire lifetime.

In addition, in prior efforts to compensate for temperature instability, the grating portion of the fiber is bare and not coated. The fiber grating is uncoated because once the temperature-insensitivity has been accomplished, the additional step of recoating the grating would change the spectral and thermal properties of the device, thus rendering it unstable to temperature variations. Leaving the grating section uncoated raises issues of reliability and packaging stability over the lifetime of the device. There is therefore a need for a recoated temperature insensitive grating that can use conventional communication grade fiber (which helps lower splice losses) and that does not need to be strained during its lifetime.

SUMMARY OF THE INVENTION

Applicants have determined that the temperature sensitivity of long period grating devices is substantially affected by the provision of a polymeric coating over the conventional glass cladding and, in particular, that by providing a polymer overcoating with an appropriately selected index of refraction, one can minimize temperature sensitivity. In a preferred embodiment, the temperature sensitivity of a long period grating written in conventional dispersion-shifted fiber is reduced to 0.40 nm/100° C. and below.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purpose of illustrating the concepts of the invention and are not to scale.

DETAILED DESCRIPTION

Figure 1:
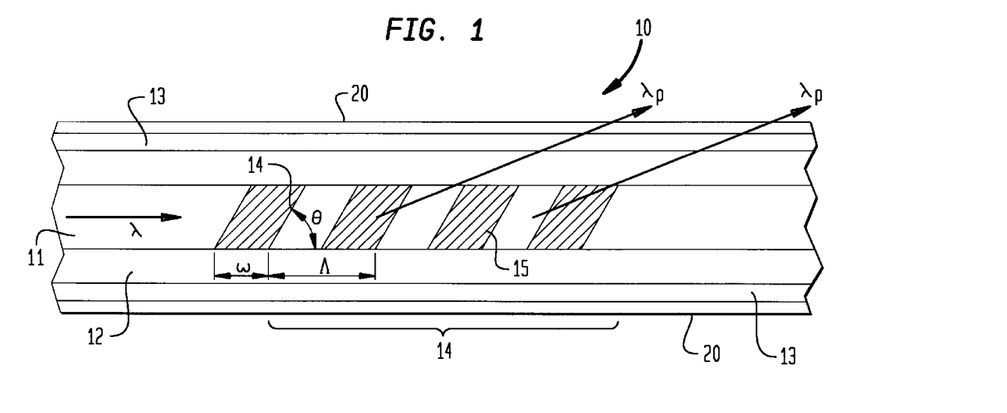
FIG. 1 is a schematic view of a long period grating in accordance with one embodiment of the invention.

Referring to the drawings, FIG. 1 is a schematic cross section of a long-period grating device having reduced temperature sensitivity. The device comprises a length of optical fiber 10 for transmitting light in a guided mode having a core 11 surrounded by a composite cladding comprising a low index portion 12 and a higher index portion 13. Both portions of cladding 12, 13 have indices of refraction lower than the index of core 11. In accordance with the invention, a polymeric overcoat 20 of selected optical properties surrounds the composite cladding.

Figure 2:
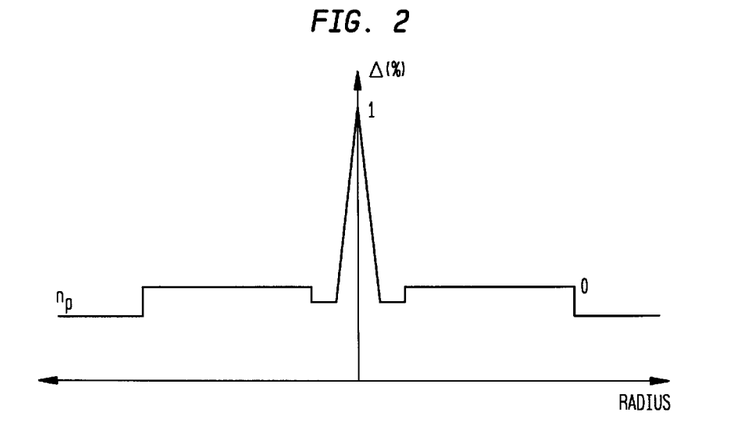
FIG. 2 is a graphical illustration of the index profile of the device of FIG. 1.

A preferred materials system is germanium-doped silica for the core 11, fluorine-doped silica for the low index portion of the cladding 12, and undoped silica for the higher index portion 13. The polymer overcoating is preferably a fluorinated acrylate with a photoinitiator. FIG. 2, which is a plot of refractive index versus distance from the core center for an exemplary fiber, shows exemplary dimensions and refractive index profile for this application.

The core 11 includes one or more long-period gratings 14, each comprising a plurality of index perturbations 15 of width w spaced apart by a periodic distance $\Lambda$ where, typically, 15 $\mu m \leq \Lambda \leq 1500$ $\mu m$. Advantageously, $\frac{1}{3}\Lambda \leq w \leq \frac{4}{5}\Lambda$ and preferably $w = \frac{1}{2}$ $\Lambda$. The perturbations are formed within the glass core of the fiber and preferably form an angle $\theta(2° \leq \theta \leq 90°)$ with the longitudinal axis of the fiber. The fiber is designed to transmit broad band light of wavelength centered about $\lambda_p$.

The spacing $\Lambda$ of the perturbations is chosen to shift transmitted light in the region of a selected wavelength $\lambda_p$ from the guided mode into a non-guided mode, thereby reducing in intensity a band of light centered about $\lambda_p$. A non-guided mode is a mode which is not propagated coherently in the core, and is typically a cladding mode, a radiation mode, or, in the case of multilayer profiles, a ring mode.

Figure 3:
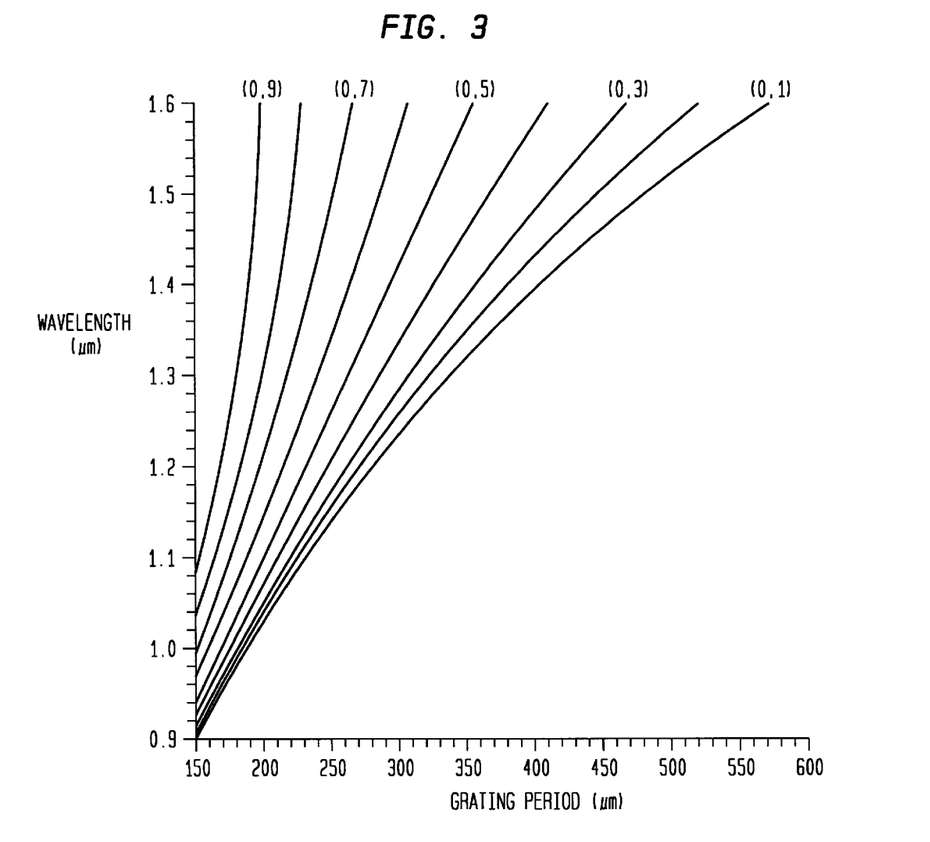
FIG. 3 is a graphical plot of center wavelength $\lambda_p$ versus $\Lambda$ useful in making the device of FIG. 1.

FIG. 3 is a graph illustrating for the fiber of FIG. 2 the periodic spacing $\Lambda$ for removing light centered about a wavelength $\lambda_p$. Thus, to make a device for removing light centered around $\lambda_p = 1450$ nm, one chooses a spacing of $\Lambda = 330$ nm as shown in FIG. 3.

The long-period grating can be formed by selectively exposing the core to beams of intense light of width w at locations separated by the distance $\Lambda$. Preferably, as a preliminary step, the fiber is loaded with molecular hydrogen or deterium to enhance the photosensitivity of the core. The preferred exposure source is UV radiation from a KrF excimer laser. Proper spacing can be effected by exposing through a slit of width w and then moving the fiber to the next exposure site. Alternatively, the fiber can be exposed to a wide beam from the laser through an amplitude mask providing a plurality of transparent slits at spacing $\Lambda$ and opening widths w. Preferably the exposure dosage for each slit is on the order of 1000 pulses of >100 mJ/cm$^2$ fluence/pulse, and the number of perturbations is in the range of 10–100.

In operation, light of wavelength $\lambda_p$ is transmitted down the fiber in a core mode. The long period grating shifts $\lambda_p$ from the core mode to a higher order mode. The fiber at the grating has one effective index $n_{01}$ for the core mode and another effective index $n_{1m}$ for the higher order mode. The $n_{01}$ is determined primarily by the geometry and index of the core. The $n_{1m}$ is determined by the indices and geometry of the cladding and, significantly, by the index $n_p$ of the polymeric overcoating. In accordance with the invention, the temperature sensitivity of the grating is minimized by choosing $n_p$ such that the effect of temperature on $n_{1m}$ closely approximates the effect of temperature on $n_{01}$. The specific chemical composition of the polymer is not relevant as long as it meets the $n_p$ and $\partial n_p/\partial T$ criteria herein described.

The polymer can be applied onto the glass fiber containing the grating as a melt or be cast from solution. A preferred process is to apply a liquid monomer or oligomer mixture that can be polymerized in situ. This polymerization can be initiated simply by mixing reactive co-monomers, by moisture, by air, by heat, or by the action of actinic radiation (preferred). Examples of suitable polymers include fluorinated polymers and silicon-based polymers (siloxanes). The former include partially or fully fluorinated polymers, such as copolymers of perfluoro-2,2-dimethyldioxole and tetrafluoroethylene sold under the tradename TEFLON AF® by duPont; ring-cyclized homopolymers of perfluoro(allyl vinyl ether) sold under the tradename CYTOP® by Asahi Glass Co.; terpolymers of tetrafluoroethylene, hexafluoroethylene, and vinylidene fluoride sold under the tradename THV FLUOROPLASTIC® by 3M; copolymers of perfluoro-2,2,-dimethyldioxole and chlorotrifluoroethylene; and terpolymers of perfluoro-2,2-dimethyldioxole, tetrafluoroethylene and chlorotrifluoroethylene. Suitable fluorinated polymers further comprise fluoroacrylates and/or their copolymers with hydrocarbon-based (non-fluorinated) acrylates (and/or methacrylates), fluoromethacrylates and/or their copolymers with hydrogen-based (non-fluorinated) acrylates (and/or methacrylates), fluorinated acrylamides, fluorinated urethanes, fluorinated epoxies, fluorinated vinyl ethers, and fluorinated vinyl esters. Mixtures of any of these fluorinated polymers, copolymers or terpolymers further may be used. Fluoroacrylates comprise esters of acrylic acid and perfluorinated or partially fluorinated alcohols, diols, or polyols. Fluoromethacrylates comprise esters of methacrylic acid and perfluorinated or partially fluorinated alocohols, diols, or polyols.

Suitable silicon-based polymers include polydimethylsiloxanes, polydiphenylsiloxanes, polymethylphenylsiloxanes, polysilanes, and polysilazanes. The silicon-based polymers further comprise polysiloxanes and polysilsesquioxanes having one or more substituents selected from the group consisting of acrylate, methacrylate, epoxy, amine, vinyl, hydride, silanol, carbinol, carboxylic acid, alkoxysilane having from 1 to 18 carbon atoms, and mercaptan. Copolymers or mixtures of any of these silicon-based polymers also may be used.

In the case of fluorine-containing polymers, the refractive index can be adjusted by changing the relative fluorine content in the polymer. In the case of siloxanes, the refractive index can be adjusted by changing the ratio of methyl to phenyl groups attached to the siloxane chain. A preferred polymer comprises at least 70% by weight of a perfluoropolyether diacrylate. Using this approach, one can make a recoated long period fiber grating with reduced temperature sensitivity below 1 nm/100° C. and preferably below 0.40 nm/100° C.

The nature and advantages of the invention can now be better understood by reference to the following specific example.

EXAMPLE

Figure 4:
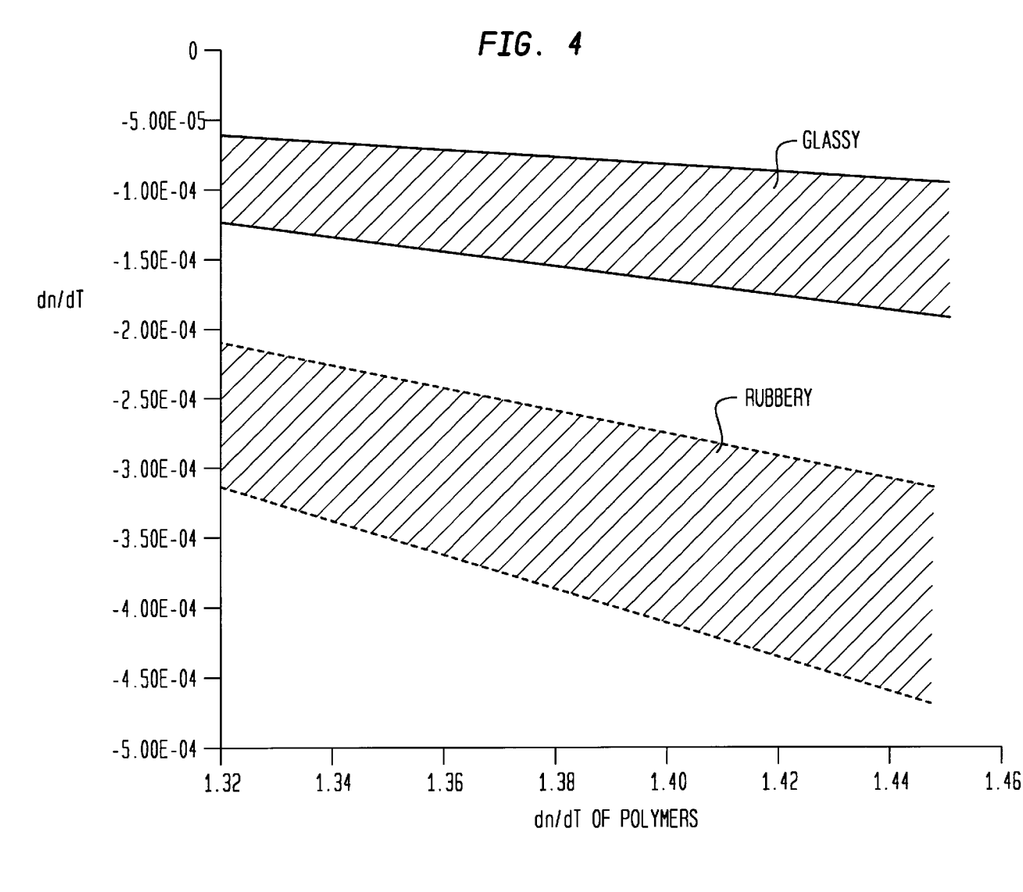
FIG. 4 is a graphical plot showing the relationship between $n_p$ and T for typical polymeric coatings.
Figure 5:
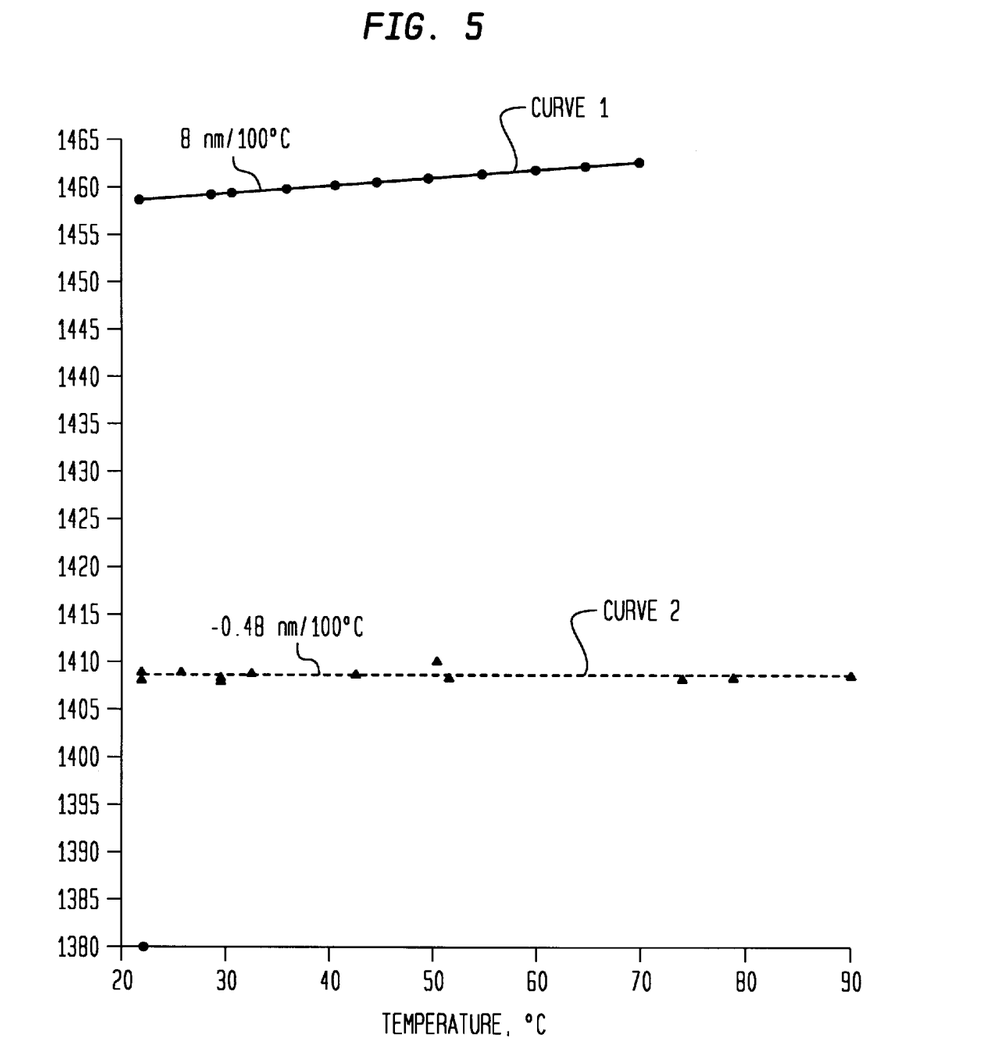
FIG. 5 is a graphical plot showing the reduced temperature sensitivity of an exemplary long period grating in accordance with FIG. 1.

In this example, we describe a specific design of a long-period grating written in a conventional dispersion-shifted fiber that will give a $d\lambda_p/dT$ approximately equal to zero. The fiber is commercially available, has a mode-field diameter of 8.5 $\mu$m, a cladding diameter of 125 $\mu$m, a core $\Delta$ of approximately 1% (10 mole % germania in the core) and is singlemode at 1550 nm. The desired effect is achieved using a low index (lower than silica) polymer coating material with a well-designed negative $dn_p/dT$. For amorphous polymers in general, the relationship between the refractive index and temperature dependence is shown in FIG. 4 for glassy polymers and rubbery polymers. A long-period grating of periodically $\Lambda=260$ $\mu$m was written in the dispersion-shifted fiber, which led to a peak wavelength of coupling between the fundamental $LP_{01}$ mode and the $HE_{5,1}$ cladding mode of 1457 nm (at room temperature). With no coating, the temperature dependence of the peak wavelength was measured to be 8 nm/100° C. (curve 1 of FIG. 5). This grating was recoated, using a perfluoropolyether diacrylate polymer with a refractive index of 1.32 and $\partial n_p/\partial T = -3.2 \times 10^{-4}/°C$. The recoated grating was then temperature cycled between 20 and 80° C., giving a temperature dependence of $-0.48$ nm/100° C. (curve 2 of FIG. 5). This reduction of the temperature dependence by more than a factor of ten and the reversal of polarity is a clear indication that the polymer can be designed to completely eliminate the temperature dependence of a grating written in a conventional communication grade fiber. The procedure for extending this design to other fibers is set forth in Part II below.

Figure 6:
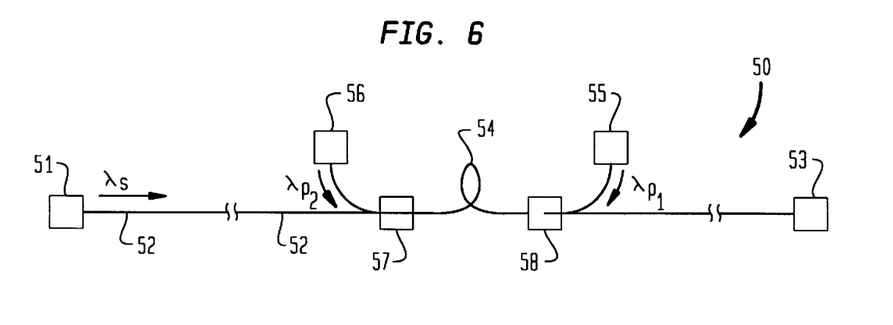
FIG. 6 shows an optical transmission system using the device of FIG. 1 to remove unused pump energy.

These temperature insensitive long period gratings are useful in optical fiber telecommunications as spectral shaping devices. FIG. 6 illustrates an optical transmission system 50 using a temperature insensitive long period spectral shaping device to remove unused pump energy. Specifically, the system 50 comprises a transmitter source 51 of optical signals such as a digitally modulated 1.55 $\mu$m signal, an optical signal path comprising a length of optical fiber 52 for transmitting the signal, and a receiver 53 for receiving and demodulating the signal. As optical amplifier such as an erbium-doped fiber amplifier 54 is disposed in the optical signal path for amplifying the transmitted signal. The amplifier is pumped by pump sources 55, 56 of optical energy of pump wavelength $\lambda_{p1}$ and $\lambda_{p2}$. Unused pump energy of each pump wavelength will pass through amplifier 54. The energy is advantageously removed from the system so that it will not deteriorate the performance of the pump sources 55, 56 and transmission and receiving equipment 51, 53. To remove unused pump energy, a long-period spectral shaping device 57 is disposed in the path of the energy from pump 55 after it has passed through amplfier 54. Specifically, in the dual-pumped laser of FIG. 6, device 57 has its spacing $\Lambda$ chosen to remove energy of wavelength $\lambda_{p1}$. A second long-period grating 58 has its spacing chosen to remove energy of wavelength $\lambda_{p2}$. In a typical application $\lambda_s$ is 1.55 $\mu$m, $\lambda_{p1}$ is 0.978 $\mu$m and $\lambda_{p2}$ is 0.98 $\mu$m. Thus, for example, device 57 could comprise a hydrogen-loaded germanosilicate fiber with core index and diameter chosen such that it allows the propagation of only the fundamental mode at $\lambda \geq 0.97$ $\mu$m. For this application the perturbations should be exposed by a dosage $\geq 100$ mJ/cm$^2$ and there should be at least 20 perturbations in each grating.

Figure 7:
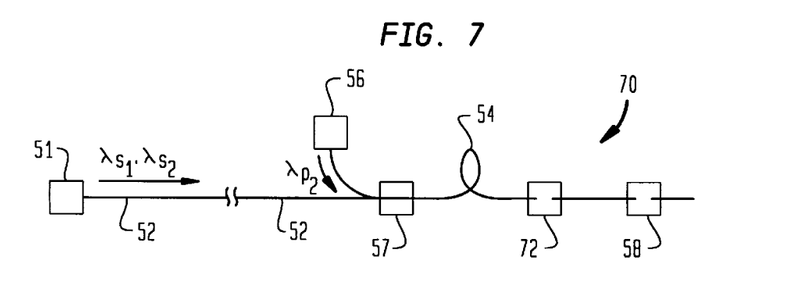
FIG. 7 shows an optical transmission system using the device of FIG. 1 to flatten the gain of an optical amplifier.

FIG. 7 illustrates an optical transmission system 70 using a temperature insensitive long period shaping device 72 to shape the spectral gain characteristics of a rare-earth doped optical fiber amplifier. Specifically it is here used to reduce the spectral dependence of an erbium-doped fiber amplifier 44. The device 72 is disposed in the path of the amplifier 54. The shaping device 72 has one set of spacings $\Lambda$ chosed to remove energy of wavelength 1.53 $\mu$m corresponding to the gain peak wavelength of the amplifier and another set of spacings to remove energy of wavelength 1.56 $\mu$m at the other gain peak. By proper choice of the number of perturbations and the dosage of exposure, the gain spectrum of the amplifier/device combination can be made substantially flat over a range of wavelengths 1530 to 1560 nm. For a typical erbium amplifier, the shipping device exposed by a dosage $\leq 100$ mJ/cm$^2$, 1000 pulses per slit will produce a more uniform gain response over the range of wavelengths 1530–1560 nm.

Advantageously, system 70 can be a WDM system using a plurality of different wavelength signals, e.g. $\lambda_{s1}$ and $\lambda_{s2}$. It should be understood that the shaping device 72 need only be in the optical path of the amplifier. It can be before, after or within the optical amplifier cavity comprising the rare-earth-doped fiber.

PRINCIPLES OF DESIGN

Gratings operate on the principle that the induced periodic index changes match the phase difference between two spatial modes in a fiber. This coupling takes place at a peak wavelength $\lambda_p$ usually defined in vacuum. A long period grating with period $\Lambda$ will couple light between two co-propagating modes ($LP_{01}$ and $L_{1m}$) that satisfy condition, $$\lambda_p = (n_{01} - n_{1m})\Lambda, \tag{1}$$

where $\Lambda$ is the period of the grating ($\Lambda$ is usually >10 $\mu$m) and $n_{1m}$ are the effective indices of the $LP_{1m}$ modes. An important parameter in the above equation is the effective index of a mode. The effective index of a mode is related to the waveguiding condition that supports the mode in a fiber and is determined by the refractive indices of the central core and all adjacent cladding layers. The coating that surrounds the fiber can be considered to be one of the cladding layers, substantially thinner than the diameter of the fiber, and is an important parameter when analyzing cladding modes. Note that the refractive indices of the different radial layers of a fiber are material properties and can be changed by choosing different material compositions. The effective indices are waveguiding properties of the modes and are directly dependent on the physical dimensions (e.g. Diameter) of the fiber and the refractive indices of all layers.

We now see how the peak wavelength changes if the temperature of the long-period grating is varied. By differentiating Eq. (1) with respect to temperature (T), we obtain:

$$\frac{d\lambda_p}{dT} = \Lambda \cdot \left(\frac{dn_{01}}{dT} - \frac{dn_{lm}}{dT}\right) + (n_{01} - n_{lm}) \cdot \left(\frac{d\Lambda}{dT}\right), \tag{2}$$

where $d\Lambda/dT$ is governed by the thermal expansion coefficient of the material. We see from Eq. (2) that to obtain a small change in peak wavelength with respect to temperature (small $d\lambda_p/dT$), we need to find materials such that the right hand side of Eq. (2) is approximately zero. Note that it is not very desirable to change $dn_{01}/dT$ since $n_{01}$ is essentially controlled by the core material and the central core material has to satisfy other optical properties such as reactivity to uv-light (in order that the uv-induced grating may be written). This requirement entails that a photosensitive silicate glass is best-suited for the core. While germania, phosphorus and boron co-doping allows for photosensitive operation, the thermal dependence of the refractive indices of these glasses does not vary much. Further, the main point of this invention is that we use commercially available fibers with no changes made to the glass regions. We therefore focus on changing the material properties of the regions surrounding the core and the cladding. Rewriting Eq. (2) to separate the dependence of the higher-order $LP_{1m}$ mode on the polymer coating, we get, $$\frac{d\lambda_p}{dT} = \left[\Lambda \cdot \frac{dn_{01}}{dT} + n_{01} \cdot \frac{d\Lambda}{dT}\right] - \left[\Lambda \cdot \frac{dn_{lm}}{dT} + n_{lm} \cdot \frac{d\Lambda}{dT}\right] \quad (3)$$

The region surrounding the cladding contains some of the power of the $LP_{1m}$ mode and both $n_{1m}$, and $dn_{1m}/dT$ are predominantly controlled by the material properties of this region. Let us assume that for a given fiber and given $\Lambda$ which couples light between two prespecified modes, the first square bracket on the right hand side of Eq. (3) is equal to $\Gamma$. Our goal is to design a coating material that surrounds the fiber with properties $n_p$ and $dn_p/dT$ (where $n_p$ is the refractive index of the polymer material), such that $\Lambda \times dn_{1m}/dT + n_{1m} \times d\Lambda/dT$ equals $\Gamma$. More specifically, we will work with the factor $\Lambda \times \partial n_{1m}/\partial n_p/\partial T$, where $n_p$ is the index of the polymer material and $\partial n_{1m}/dn_p$ denotes the dependence of the effective index of the $LP_{1m}$ mode on the polymer refractive index. The term $\partial n_{1m}/\partial n_p$ can be modified by choosing a mode which spreads out to different levels into the coating and is thus variably affected by the coating index.

The choice of a suitable polymer material can lead to different values of $\partial n_p/\partial T$. The changes of the polymer refractive index with temperature is given by the following expression [Bohn, in "Polymer Handbook," J. Brandrup and E. H. Immergut, Eds., second edition, Wiley, 1975, p. 241]:

$$\frac{\partial n_p}{\partial T} = -\frac{\alpha}{6n_p} \cdot (n_p^2 + 2) \cdot (n_p^2 - 1), \quad (4)$$

where $\alpha$ is the volumetric thermal expansion coefficient of the polymer. Since $\alpha$ is positive for all polymers and $n_p$ is >1, $\partial n_p/\partial T$ is negative. The refractive index of the polymer $n_p$, cannot be higher than the index of the glass cladding in order to permit propagation of cladding modes.

Figure 8:
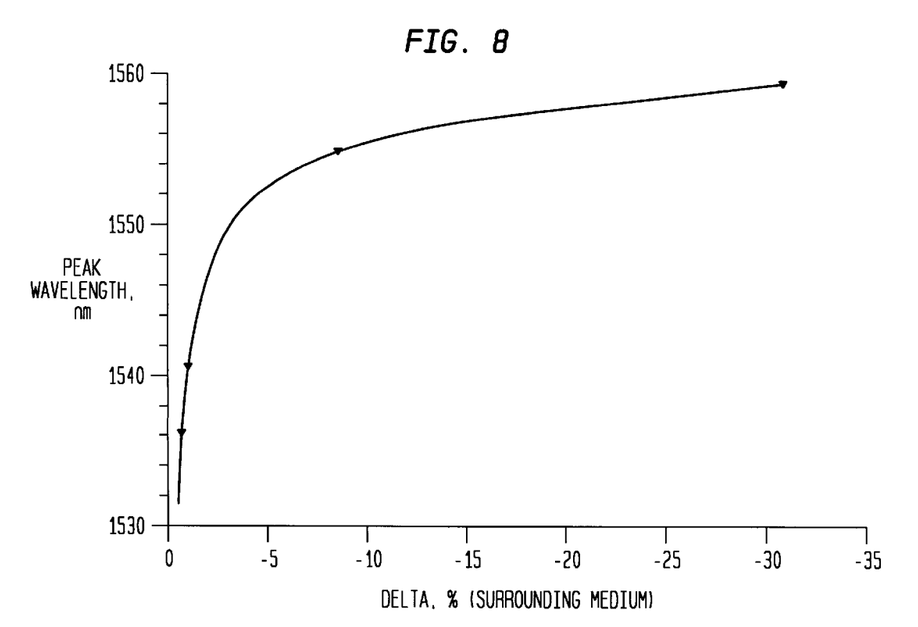
FIG. 8 is a graphical plot showing the typical shift of peak wavelength due to the change of the index of refraction of the surrounding medium.

A suitable polymer for this application can be designed such that the condition of thermal insensitivity is met. A general approach to designing the polymer is given below:

1. Long-period fiber gratings are fabricated in a conventional optical fiber.
2. The temperature dependence of the peak wavelengths corresponding to the different modes in the fiber are characterized.
3. The effect of recoating the grating with polymers of different refractive indices and different $dn_p/dT$ is evaluated.
4. A plot of wavelength shift as a function of recoating index provides insight into the dn/dT requirements on the polymer. Such a plot is shown in FIG. 8. Steps (1)–(4) allow us to evaluate the range of values for the terms $\Lambda \times dn_{1m}/dT$, $n_{1m} \times dL/dT$, and $\partial n_{1m}/\partial n_p$. From Eqn. (3) and the conditions described above, we now need to pick a value for $\partial n_p/\partial T$ such that the condition $\Lambda \times dn_{1m}/dT + n_{1m} \times dL/dT \times \Gamma$ is met.
5. A suitable polymer is chosen using Eqn. (4) above. The emphasis is on picking the right combination of $n_p$ and $dn_p/dT$ to make $d\lambda_p/dT$ zero.
6. The long-period grating is recoated and its temperature dependence is measured for the mode under conditions.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

The invention claimed is:

1. A long-period grating with a center wavelength $\lambda_p$ having enhanced stability to variations in temperature comprising:
   an optical fiber including a core having an effective mode index of refraction $n_{core}$, a cladding surrounding said core having an effective mode index $n_{cladding}$ less than $n_{core}$, said core having a grating region comprising a plurality of perturbations in its refractive index spaced apart by a periodic distance $\Lambda$ to form the long period grating with a center wavelength $\lambda_p$;
   wherein a polymeric overcoat layer is disposed around said cladding along said grating region, said polymeric overcoat layer having a refractive index $n_p$ and a first derivative with respect to temperature $n_p/dT$, and said polymeric overcoat layer is substantially thinner than the diameter of said optical fiber;
   and wherein $n_p$ and $dn_p dT$ are chosen so that the rate of change of $\lambda_p$ with respect to temperature is less than 1 nm/100° C.

2. The grating of claim 1 wherein the $n_p$ and $dn_p dT$ are chosen so that the rate of change of $\lambda_p$ with respect to temperature is less than 0.40 nm/100° C.

3. The grating of claim 1 wherein the polymeric overcoat layer comprises a fluorinated polymer.

4. The grating of claim 3 wherein the fluorinated polymer is selected from the group consisting of (a) fluoroacrylates, fluoromethacrylates, fluorinated acrylamides, fluorinated urethanes, fluorinated epoxies, fluorinated vinyl ethers, fluorinated vinyl esters, ring-cyclized homopolymers of perfluoro(allyl vinyl ether), co-polymers of fluorinated acrylates or methacrylates and non-fluorinated acrylates or methacrylates, copolymers of perfluoro-2,2,-dimethyldioxole and tetrafluoroethylene, copolymers of perfluoro-2,2-dimethyldioxole, tetrafluoroethylene and chlorotrifluoroethylene and (ii) tetrafluoroethylene, hexafluoroethylene, and vinylidene fluoride, and (b) mixtures thereof.

5. The grating of claim 3 where the polymeric overcoat layer comprises a perfluoropolyether diacrylate.

6. The grating of claim 5 wherein said silicon-based polymer is selected from the group consisting of (i) polydimethylsiloxanes, polydiphenylsiloxanes, polymethylphenylsiloxanes, polysilanes, and polysilazanes, and polysiloxanes and polysilsesquioxanes having one or more substituents selected from the group consisting of acrylate, methacrylate, epoxy, amine, vinyl, hydride, silanol, carbinol, carboxylic acid, alkoxysilane having from 1 to 18 carbon atoms, and mercaptan; and (ii) copolymers and mixtures thereof.

7. The grating of claim 1 wherein the polymeric overcoat layer comprises a silicon-based polymer.

8. An optical fiber communications system comprising:
   a source of an optical signal;
   optically coupled to said source, an optical signal path comprising length of optical fiber for transmitting said optical signal;
   disposed in said optical pa thy, an optical amplifier for amplifying said optical signal;
   a pair of pumping sources for pumping said optical amplifier with optical pumping energy of wavelength $\lambda_{p1}$ and $\lambda_{p2}$,
   disposed in the path of energy from each pump after said pumping energy has passed through said amplifier unused, a spectral shaping device for removing said unused pumping energy from said optical path comprising a long-period grating according to claim 1.

9. A communications system according to claim 8 wherein said optical amplifier comprises an erbium-doped optical fiber amplifier.

10. A optical fiber communications system comprising:

a source of at least one optical signal;

optically coupled to said source, an optical signal path comprising a length of optical fiber for transmitting said optical signal;

disposed in said optical signal path, an optical amplifier having a gain spectral dependence with one or more peak regions providing different gain for different wavelengths, disposed in said optical signal path, a spectral shaping device comprising a long-period grating device according to claim 1 for removing energy from the spectral region of one or more of said peak regions in order to provide a more uniform spectral output.

11. A communications system according to claim 10 wherein said optical amplifier comprises an erbium-doped optical fiber amplifier.

12. An optical fiber amplifier comprising a rare-earth doped length of optical fiber, and a long-period grating according to claim 1 in the path of said fiber for shaping the spectral gain characteristics of said amplifier.

13. A long-period grating with a center wavelength $\lambda_p$ having enhanced stability to variations in temperature comprising:

an optical fiber including a core having an effective mode index of refraction $n_{core}$, a cladding surrounding said core having an effective mode index $n_{cladding}$ less than $n_{core}$, said core having a grating region comprising a plurality of perturbations in its refractive index space apart by a periodic distance $\Lambda$ to form the long period grating with a center wavelength $\lambda_p$;

wherein a polymeric overcoat layer is disposed around said cladding along said grating region, the polymeric overcoat layer having a refractive index $n_p$ and a first derivative with respect to temperature $dn_p/dT$, and said polymeric overcoat layer is substantially thinner than the diameter of said optical fiber;

and wherein $n_p$ and $dn_p/dT$ are chosen so that the rate of change of $\lambda_p$ with respect to temperature is less than 1 nm/100° C. without applying strain to the fiber.

14. The grating of claim 13 wherein the $n_p$ and the $dn_p/dT$ are chosen so that the rate of change of $\lambda_p$ with respect to temperature is less than 0.40 nm/100° C.

15. The grating of claim 13 wherein the polymeric overcoat layer comprises a partially fluorinated polymer or a fully fluorinated polymer.

16. The grating of claim 15 wherein the fluorinated polymer is chosen from the group of Teflon AF®, Cytop®, fluoroacrylates and/or their copolymers with hydrocarbon-based acrylates (and/or methacrylates), fluoromethacrylates and/or their copolymers with hydrogen-based acrylates (and/or methacrylates), fluorinated acrylamides, fluorinated urethanes, fluorinated epoxies, fluorinated vinyl esters, or mixtures thereof.

17. The grating of claim 13 wherein the polymeric overcoat layer comprises a silicon-based polymer chosen from the group of polydimethylsiloxanes, polydiphenylsiloxanes, polymethylphenylsiloxanes, polysilanes, polysilizanes, polysiloxanes and/or polysilsesquioxanes containing acrylate, methacrylate, epoxy, amine, vinyl, hydride, silanol, carbinol, carboxylic acid, alkoxysilane, and/or mercaptan substituents, and copolymers and/or mixtures thereof.

18. A optical fiber communications system comprising:

a source of at least one optical signal;

optically coupled to said source, an optical signal path comprising a length of optical fiber for transmitting said optical signal;

disposed in said optical signal path, an optical amplifier having a gain spectral dependence with one or more peak regions providing different gain for different wavelengths;

disposed in said optical signal path, a spectral shaping device comprising a long-period grating device according to claim 13 for removing energy from the spectral region of one or more of said peak regions in order to provide a more uniform spectral output.

19. A long-period grating with a center wavelength $\lambda_p$ having enhanced stability to variations in temperature comprising:

an optical fiber including a core having an effective mode index of refraction $n_{core}$, a cladding surrounding said core having an effective mode index $n_{cladding}$ less than $n_{core}$, said core having a grating region comprising a plurality of perturbations in its refractive index spaced apart by a periodic distance $\Lambda$ to form the long period grating with a center wavelength $\lambda_p$;

wherein an unpackaged polymeric overcoat layer is disposed around said cladding along said grating region, said unpackaged polymeric overcoat layer having a refractive index $n_p$ and a first derivative with respect to temperature $dn_p/dT$, and said unpackaged polymeric overcoat layer is substantially thinner than the diameter of said optical fiber;

and wherein $n_p$ and $dn_p dT$ are chosen so that the rate of change of $\lambda_p$ with respect to temperature is less than 1 nm/100° C.

* * * * *